United States Patent [19]

Newmayer

[11] 4,137,617
[45] Feb. 6, 1979

[54] CIRCULAR GRATER FOR CUTTING PLASTIC

[76] Inventor: Rickey L. Newmayer, 25711 Frampton, Harbor City, Calif. 90710

[21] Appl. No.: 842,520

[22] Filed: Oct. 17, 1977

Related U.S. Application Data

[63] Continuation-in-part of Ser. No. 831,381, Sep. 7, 1977, abandoned.

[51] Int. Cl.$^2$ ............................................. B23D 71/00
[52] U.S. Cl. ....................................................... 29/78
[58] Field of Search ................ 29/76.78; 76/101 SM; 51/170

[56] References Cited

U.S. PATENT DOCUMENTS

| 1,451,809 | 4/1923 | Bell | 29/78 |
| 1,729,881 | 10/1929 | Lambert | 29/78 |
| 3,008,217 | 11/1961 | Hall | 29/78 |
| 3,165,813 | 1/1965 | Harvell et al. | 29/78 |
| 3,601,874 | 8/1971 | Sakamoto et al. | 29/76 |
| 3,737,984 | 6/1973 | Pietroski | 29/78 |

FOREIGN PATENT DOCUMENTS

| 697773 | 11/1930 | France | 29/78 |
| 666622 | 2/1952 | United Kingdom | 29/78 |
| 841183 | 7/1960 | United Kingdom | 29/78 |

Primary Examiner—Harrison L. Hinson
Attorney, Agent, or Firm—W. Edward Johansen

[57] ABSTRACT

The present invention is a circular grater for use in combination with a power-driven hand tool. The power driven hand tool includes a motor within a housing and a shaft mechanically driven thereby. The hand tool also includes a circular mounting member which is mechanically coupled to the shaft so that it rotates thereon and a first flat disc-shaped member which is mechanically coupled to the circular mounting member. The circular grater includes a second flat disc-shaped member which has a first surface adapted for grating a plastic material and a second surface, a plurality of coupling members each of which has a disc-shaped head portion which is mechanically coupled to the second surface of the second flat disc-shaped member, a cylinder-shaped portion of a particular diameter and a screw portion of a diameter smaller than the particular diameter which is adapted to be inserted into a hole in the first flat disc-shaped member, and a plurality locking wing nuts for fastening the coupling members.

1 Claim, 13 Drawing Figures

CIRCULAR GRATER FOR CUTTING PLASTIC

This patent application is a continuation-in-part application of a patent application filed by the inventor on Sept. 7, 1977 having Ser. No. 831,381 and entitled An Improved Circular Grater for Cutting Plastic, and now abandoned.

BACKGROUND OF THE INVENTION

1. Field of the Invention

The present invention relates to a device for cutting plastic, and more particularly to a circular grater for use in combination with a power-driven hand tool.

2. Description of the Prior Art

In the automobile-body repair industry, a plastic material, generally referred to in the trade as bondo, is used to cover dented or repaired areas on the surface of the automobile-body. Presently an individual places this plastic material on the area to be covered and then grates off the excess material to form a smooth surface. The individual uses rectangularly shaped member having a first surface adapted for grating a plastic material and being attached to a handle. The individual spends many man-hours cutting down the plastic material.

U.S. Pat. No. 1,729,881, entitled Rotary-Disc File, issued to Homer P. Lambert on Oct. 1, 1929, teaches a rotary disc file having perforations in its face and driving shaft on which it is centrally mounted in combination with a rigid back plate spaced from the disc file to form a dust chamber.

U.S. Pat. No. 4,028,781, entitled Surfacing Tool, issued to Joseph D. Konrad on June 14, 1977, teaches a perforated abrasive metal which is adapted for use instead of sandpaper in a reciprocating sander.

U.S. Pat. No. 2,708,376, entitled Cutting and Abrading Tools, issued Christopher Hodgson Booth, on May 17, 1955 teaches a method of providing hardened cutting edges on the surface of a strip or sheet of thin flexible steel. U.S. Pat. No. 2,678,571, entitled Method of Making Cutting Tool, issued to Christopher Hodgson Booth on May 18, 1954 and U.S. Pat. No. 2,769,225, entitled Cutting and Abrading Tool, issued to Christopher Hodgson on Nov. 6, 1956, teaches a cutting tool having a multiplicity of successive cutting edges on one surface thereof with the edges having positive rake and clearance angles and all facing in the same geneal direction for cutting. U.S. Pat. No. 2,820,281, entitled Abrasive Article, issued to Alfred W. Amsen on Jan. 21, 1958 also teaches an abrasive article with an abrasive surface on a sheet of relatively thin and flexible metal.

U.S. Pat. No. 3,509,611, entitled Rasp File, issued to David E. Kifer on May 5, 1970 teaches a rasp file having a multitude of cutting edges arranged in pairs of diagonal rows, with the cutting edges in the alternate pairs of rows axially aligned with each other and the cutting edges in the intermediate pairs of rows axially aligned with each other but slightly staggered or offset with respect to the alternate pairs of rows so that the paths of the cutting edges in the intermediate pairs of rows transversely overlap the paths of cutting edges in the alternate pairs of rows when the file is moved in a generally longitudinal direction. Each cutting edge is immediately preceded by a generally square opening of sufficient size for effective removal of chips.

SUMMARY OF THE INVENTION

In view of the foregoing factors and conditions characteristic of the prior art, it is a primary of the present invention to provide a circular grater for use in combination with a power-driven hand tool which will reduce the number of man-hours in cutting down the amount of excess plastic material.

It is another object of the present invention to provide a circular grater that is mechanically compatible with the work disc of a power-driven hand tool.

It is still another object of the present invention to provide a circular grater for use in combination with a power-driven hand tool that is mechanically coupled to the work-disc thereof so that the circular disc can be easily cleaned with a blast of high pressure air.

In accordance with an embodiment of the present invention, a circular grater for use in combination with a power-driven hand tool is described. The power-driven hand tool includes a motor within a housing and a shaft mechanically driven thereby. The hand tool also includes a circular mounting member which is mechanically coupled to the shaft so that it rotates thereon and a first flat disc-shaped member which is mechanically coupled to the circular mounting member. The circular grater includes a second flat disc-shaped member which has a first surface adapted for grating a plastic material and a second surface, a plurality of coupling members each of which has a disc-shaped head portion, which is mechanically coupled to the second surface of the second flat disc-shaped member, a cylinder-shaped portion of a particular diameter and a screw portion of a diameter smaller than the particular diameter, which is adapted to be inserted into a hole in the first flat disc-shaped member, and a plurality locking wing nuts for fastening the coupling members.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
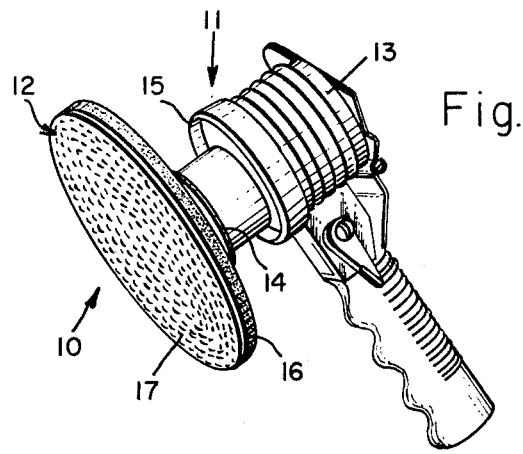
FIG. 1 is a perspective drawing of a power-driven hand tool which is used in combination with a circular grater for cutting plastic, which is constructed in accordance with the principles of the present invention.

The present invention is a circular grater. In order to best understand the present invention one should refer to a description of its preferred embodiment in conjunction with the accompanying drawing. In FIG. 1 a circular grater 10 for cutting plastic, which is used in combination with a power-driven hand tool 11, is a flat disc shaped member 12. The power-driven hand tool 11 includes a motor within a housing 13 which has a shaft 14 thereon, a head member 15 fixedly mounted at the free end of the shaft 14, a work disc 16 mounted on the head member to rotate freely thereon relative to the housing 13 about an axis which is offset radically from the axis of the shaft 14. The power-driven hand tool 11 is taught in U.S. Pat. No. 2,794,303, issued to David R. Wickes on June 4, 1957. The power-driven hand tool 11, which is taught in U.S. Pat. No. 2,794,303, includes a device for optionally locking the work disc 16 to the head member 15 to cause the work disc 16 to rotate as a unit with the head member 15 or to rotate freely on the head member 15 relative to the housing 13.

Figure 2:
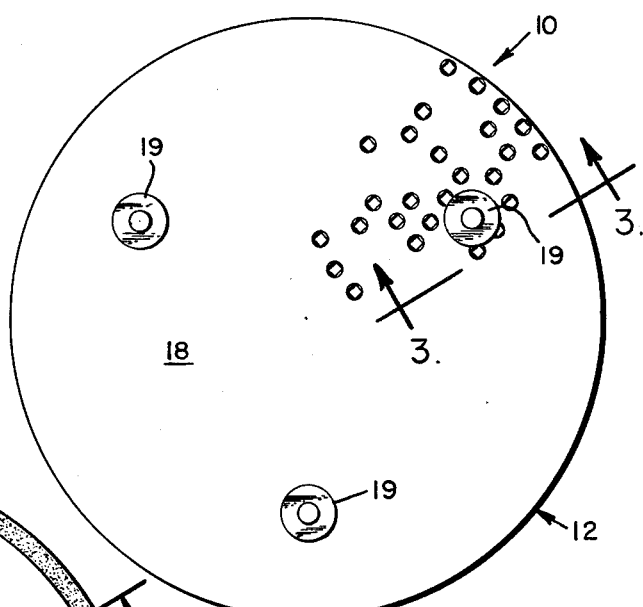
FIG. 2 is a bottom plan view of the circular grater of FIG. 1.

Still referring to FIG. 1 the circular grater 10 includes a first surface 17 of the flat disc-shaped member 12 which is adapted for grating a plastic material. Referring now to FIG. 2 the circular grater also includes a second surface 18.

Figure 3:
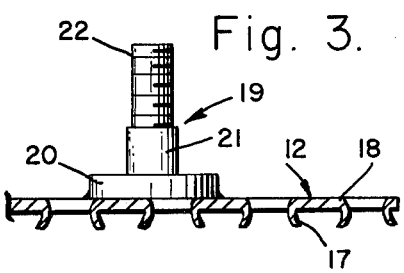
FIG. 3 is a partial side elevational view of the circular grater of FIG. 2 taken along the line 3—3.

Referring to FIG. 3 in conjunction with FIG. 2 the circular grater 10 further includes a plurality of coupling members 19, each of which has a disc-shaped head portion 20, which is mechanically coupled to the second surface 18 of the flat disc-shaped member 12, a cylinder-shaped portion 21 of a particular diameter and a screw portion 22 of a diameter smaller than the particular diameter.

Figure 4:
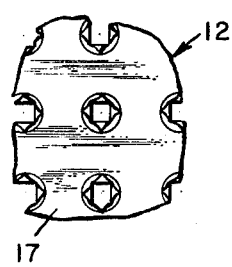
FIG. 4 is an enlarged fragmentary view of the bottom plan view of the circular grater of FIG. 1.

Referring now to FIG. 4 the first surface 17 of the flat disc-shaped member 12 is shown in an enlarged framentary of the plan view of FIG. 2. The first flat surface 17 may be adapted in any manner so long as it cuts a plastic material.

Figure 5:
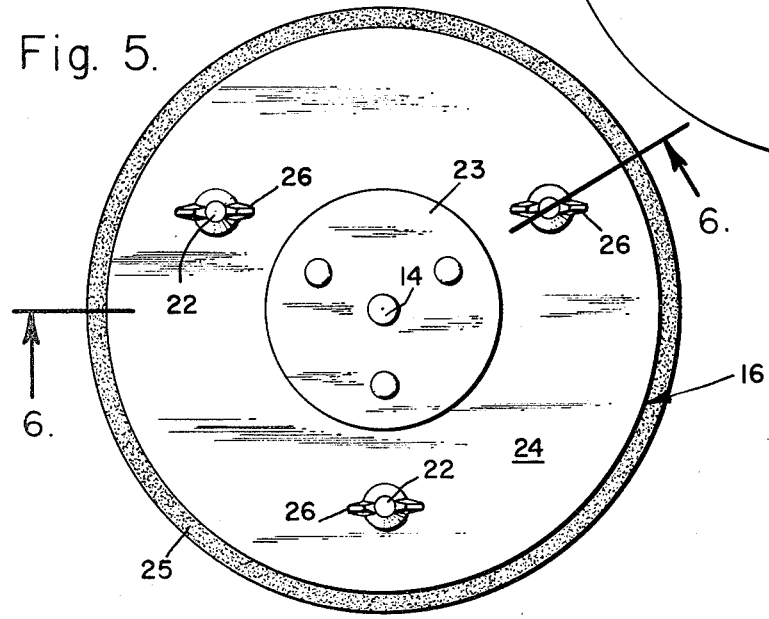
FIG. 5 is a top plan view of the work disc of the power-driven hand tool of FIG. 1 which is mechanically coupled to the circular grater.

Referring now to FIG. 5 the work disc 16 includes a circular mounting member 23 which is mechanically coupled to the shaft 14 so that it may rotate thereon and a flat disc-shaped member 24 which is mechanically coupled to the circular mounting member 23. The work disc 16 also includes a disc-shaped, neoprene member 25 to which a sanding disc may attach, but which is not necessary to use with the circular grater 10 which is placed away from the surface of the disc-shaped, neoprene member 25 and secured by the plurality of coupling members 19.

Figure 6:
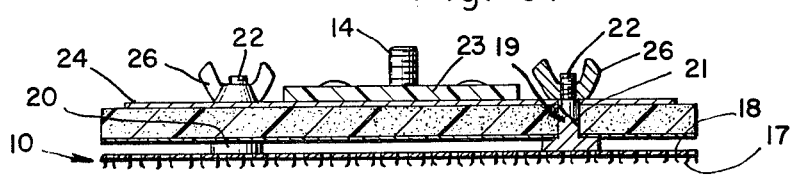
FIG. 6 is a cross-sectional side view of the work disc and the circular grater of FIG. 5 taken along the line 6—6.

Referring to FIG. 6 in conjunction with FIG. 5 the circular grater 10 is placed onto the work disc 16 and secured thereto by a plurality of locking wing nuts 26 each of which fastens one of the coupling members 19 to the work disc 16.

In operation the circular grater 10 cuts in the same manner as a circular sander. The use of the circular grater 10 speeds up the process of cutting down excess plastic material on automobile bodies.

Figure 7:
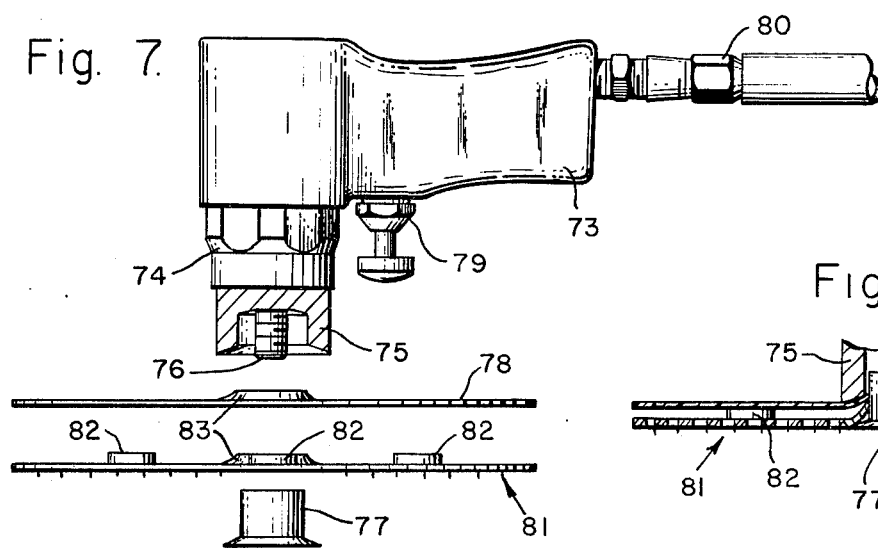
FIG. 7 is an exploded side elevational view of a power-driven hand tool which is used in combination with a circular grater of a second type for cutting plastic.

Referring to FIG. 7 a second embodiment of the present invention is adapted for use in combination with a power-driven hand tool 71 which includes a motor within a housing 13 which has a mounting member 74 on which a rotating head 75 having a threaded shaft 76 is mounted. The power-driven hand tool 71 also includes a cylindrical fastening member 77 and a work disc 78 which is mechanically coupled to the threaded shaft 76 and secured thereto by the cylindrical fastening member 77. The power-driven hand tool 71 further includes a control valve 79 and air inlet 80 which is mechanically coupled to a source of air pressure.

Still referring to FIG. 7 the second embodiment of the present invetion is a circular grater 81 which is a disc-shaped member which is adapted for grating a plastic material. The circular grater 81 is aligned with the work disc 78 and spaced apart therefrom by a set of three projecting raised members 82. The circular grater 81 is mechanically coupled to the cylindrical fastening member 77 and is also spaced apart from the work disc 78 by a central projecting raised member 83 which a circular hole 84 therethrough.

Figure 8:
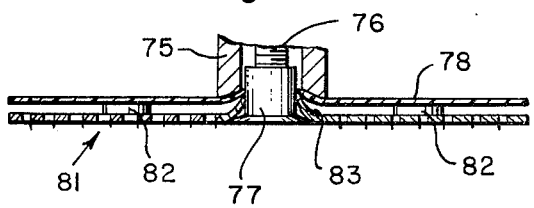
FIG. 8 is a side cross-sectional view of the cylinder grater of FIG. 7.

Referring not to FIG. 8 the circular grater 81 has a bottom surface which is adapted for cutting plastic. The circular grater 81 is also shown mechanically coupled to the power-driven hand tool 71.

Figure 9:
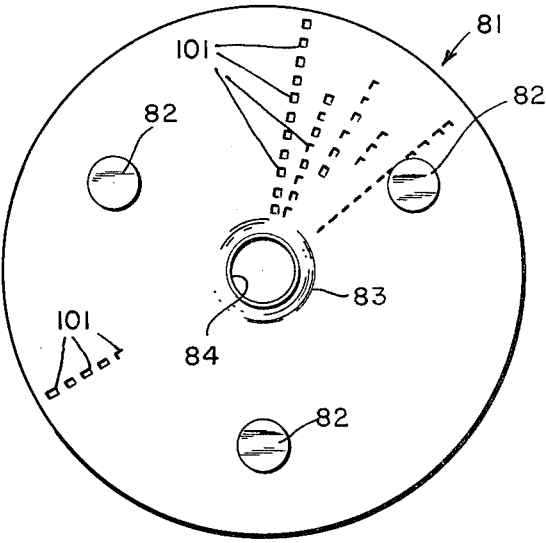
FIG. 9 is a top plan view of the circular grater of FIG. 7.
Figure 10:
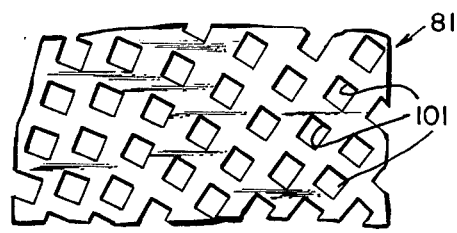
FIG. 10 is a partial bottom plan view of the circular view of the circular grater of FIG. 7.
Figure 11:
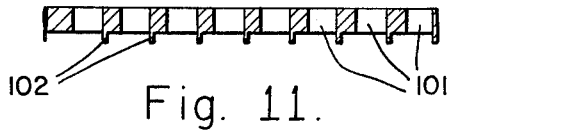
FIG. 11 is a partial side cross-sectional view of the circular grater of FIG. 7.

Referring now to FIG. 9 in conjunction with FIG. 10 and FIG. 11 the circular grater 81 has a surface adapted for cutting plastic which has a plurality of square holes 101 each of which has a cutting edge 102 in accordance with a patent issued to David E. Kifer on May 5, 1970, entitled Rasp File, U.S. Pat. No. 3,509,611.

Figure 12:
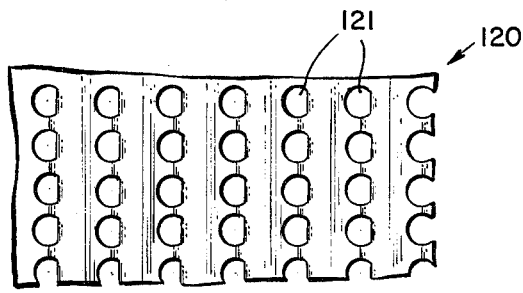
FIG. 12 is a partial bottom view of a circular grater of a third type for cutting plastic.
Figure 13:
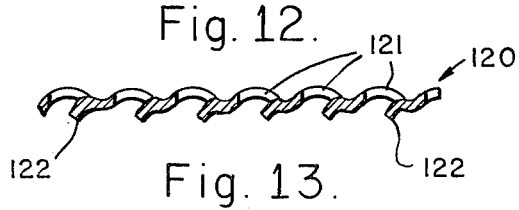
FIG. 13 is a partial side cross-sectional view of the circular grater of FIG. 12.

Referring to FIG. 12 and FIG. 13 also in conjunction with FIG. 9 a circular grater 120 of a third type has a plurality of circular holes 121 each of which has a cutting edge 122 in accordance with a patent issued to Christopher Hodgson on May 17, 1955, entitled Cutting and Abrading Tools, U.S. Pat. No. 2,708,376.

Accordingly it is intended that the foregoing disclosure and showing made in the drawing shall be considered only as an illustration of the present invention. Furthermore it should be noted that the sketches are not drawn to scale and that distances of and between the various figures are not to be considered significant. The invention will be set forth with particularity in the appended claims.

What is claimed is:

1. A circular grater for cutting plastic for use in combination with a hand power-driven tool which has a motor within a housing and a shaft mechanically driven thereby and which includes:
   a. a circular mounting member, mechanically coupled to the shaft so that it rotates thereon; and
   b. a first flat disc-shaped member which is mechanically coupled to the circular mounting member; said circular grater comprises:
     a. a second flat disc-shaped member having a first surface adapted for grating a plastic surface and a second surface;
     b. a plurality of coupling members each of which having a disc-shaped head portion, which is mechanically coupled to said second surface of said second flat disc-shaped member, a cylinder-shaped portion of a particular diameter and a screw portion of a diameter smaller than the particular diameter, said coupling members adapted to have their said screw portions inserted into holes in the first flat disc-shaped member; and c. a fastening means for fastening said plurality of coupling members in order to mechanically couple said second flat disc-shaped member to the first flat disc-shaped member.

* * * * *